(12) United States Patent
Burford

(10) Patent No.: US 9,132,504 B2
(45) Date of Patent: *Sep. 15, 2015

(54) END EFFECTOR FOR FORMING SWEPT FRICTION STIR SPOT WELDS

(71) Applicant: Wichita State University, Wichita, KS (US)

(72) Inventor: Dwight A. Burford, Wichita, KS (US)

(73) Assignee: Wichita State University, Wichita, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,165

(22) Filed: Apr. 24, 2013

(65) Prior Publication Data

US 2013/0341375 A1    Dec. 26, 2013

Related U.S. Application Data

(63) Continuation of application No. 12/703,648, filed on Feb. 10, 2010, now Pat. No. 8,444,040.

(60) Provisional application No. 61/151,655, filed on Feb. 11, 2009.

(51) Int. Cl.
*B23K 20/12* (2006.01)

(52) U.S. Cl.
CPC ......... *B23K 20/1245* (2013.01); *B23K 20/1265* (2013.01)

(58) Field of Classification Search
CPC .... B23K 20/12; B23K 20/1265; B23K 20/12; B23K 20/1235; B23K 20/1245

USPC .............. 228/2.1, 112.1, 102, 103; 269/48.2, 269/54.1, 53; 409/64, 70, 73, 66

See application file for complete search history.

(56) References Cited

U.S. PATENT DOCUMENTS

| | | | |
|---|---|---|---|
| 4,726,717 A | 2/1988 | Schmid | |
| 5,893,507 A | 4/1999 | Ding et al. | |
| 6,168,066 B1 * | 1/2001 | Arbegast | 228/102 |
| 6,497,355 B1 * | 12/2002 | Ding et al. | 228/2.1 |
| 6,663,327 B2 | 12/2003 | Linderholm et al. | |
| 6,669,075 B2 | 12/2003 | Colligan | |
| 6,722,556 B2 | 4/2004 | Schilling et al. | |
| 7,225,966 B2 | 6/2007 | Christmer | |
| 8,444,040 B2 * | 5/2013 | Burford | 228/2.1 |
| 2006/0032887 A1 * | 2/2006 | Haynie et al. | 228/2.1 |
| 2006/0289604 A1 | 12/2006 | Zettler et al. | |
| 2010/0038407 A1 | 2/2010 | Keshavan et al. | |
| 2010/0072261 A1 | 3/2010 | Cruz et al. | |
| 2010/0200642 A1 | 8/2010 | Burford | |

OTHER PUBLICATIONS

"U.S. Appl. No. 12/703,648, Final Office Action mailed Sep. 24, 2012", 7 pgs.
"U.S. Appl. No. 12/703,648, Non Final Office Action mailed Feb. 29, 2012", 10 pgs.

(Continued)

*Primary Examiner* — Scott Kastler
*Assistant Examiner* — Michael Aboagye
(74) *Attorney, Agent, or Firm* — Schwegman Lundberg & Woessner, P.A.

(57) ABSTRACT

An apparatus includes a connector and is configured to mount to a machine having multiple axes of control. A control signal on the connector determines a path of a rotating tool holder.

11 Claims, 7 Drawing Sheets

(56) References Cited

OTHER PUBLICATIONS

"U.S. Appl. No. 12/703,648, Notice of Allowance mailed Jan. 24, 2013", 8 pgs.
"U.S. Appl. No. 12/703,648, Response filed Aug. 6, 2012 to Non Final Office Action mailed Feb. 29, 2012", 13 pgs.
"U.S. Appl. No. 12/703,648, Response Filed Dec. 27, 2011 to Restriction Requirement Received Oct. 25, 2011", 9 pgs.
"U.S. Appl. No. 12/703,648, Response filed Dec. 20, 2012 to Final Office Action mailed Sep. 24, 2012", 9 pgs.
"U.S. Appl. No. 12/703,648, Restriction Requirement mailed Oct. 25, 2011", 6 pgs.
Addison, A C, et al., "Friction Stir Spot Welding: Principal parameters and their effects", 5th International Friction Stir Welding Symposium, (2004), 10 pgs.

* cited by examiner

END EFFECTOR FOR FORMING SWEPT FRICTION STIR SPOT WELDS

CLAIM OF PRIORITY

This patent application claims the benefit of priority to U.S. patent application Ser. No. 12/703,648, entitled "END EFFECTOR FOR FORMING SWEPT FRICTION STIR SPOT WELDS", filed on Feb. 10, 2010, now U.S. Pat. No. 8,444,040, issued on May 21, 2013, which claims the benefit of priority to U.S. Provisional Patent Application Ser. No. 61/151,655, entitled "END EFFECTOR FOR FORMING SWEPT FRICTION STIR SPOT WELDS," filed on Feb. 11, 2009, and which are incorporated herein by reference in their entirety.

BACKGROUND

In the aerospace industry, one traditional fastener is a rivet. Manual installation of a rivet is labor intensive and thus costly. Automated installation of a rivet is capital intensive, requiring complex programming and tooling to accomplish the multiple steps involved, including drilling, deburring, installation, and finishing (e.g. "bucking" the rivet).

OVERVIEW

The present subject matter is directed to methods and systems for forming a swept friction stir spot weld (SFSSW), also known as an "in situ integral fastener." An in situ integral fastener is a discrete fastener that is mechanically fabricated in place. Friction stir welding entails moving a non-consumable rotating tool through a work piece at a speed that plasticizes (but does not melt) the work piece and forms a solid state joint. A spot weld can be formed by insertion and withdrawal of the rotating tool. An SFSSW can be formed by moving the rotating tool about the site of the spot weld to increase the shear area of the joint. The rotating tool can be moved about the site in a pattern that may be circular, elliptical, octagonal, or other shape in order to form a discrete, integral joint.

The SFSSW can be produced using an end effector. The end effector can be mounted to a robotic structure (e.g., a serial linkage structure or a parallel kinematic machine) or mounted to a machine tool such as a milling machine or lathe. An example of the system includes an end effector having a number of rotating components configured to move the weld tool in a circumscribed (or other predetermined) path to form a discrete joint. In one example, the system includes a structure to move the weld tool in an eccentric path.

In one example, the system is configured to move a weld tool in one of a plurality of selectable paths. The plurality of paths can correspond to an assortment of in situ integral fasteners, each tailored for a particular joining application.

The present subject matter includes an apparatus for attachment to a machine having a rotating spindle or having multiple axis of control. The apparatus includes a tool holder for a rotating tool, a power unit, and a plurality of sleeves that carry the rotating tool in a swept pattern suitable for forming a swept friction stir spot weld. In one example, the tool holder is coupled to an output drive of the power unit.

The apparatus, or end effector, enables the tool to plunge, sweep, and retract relative to the work piece. In one example, the tool includes a shoulder and a fixed probe which can be plunged and retracted simultaneously. In one example, the tool includes a shoulder having a probe that can be retracted or extended independent of the shoulder position. In this example, the shoulder can remain in contact with the work piece while the probe is retracted from the work piece (during a closeout phase of the weld path), thus reducing or eliminating the exit hole at the site of the friction stir welded discrete integral fastener.

The tool can plunge into a butt joint, a lap joint, or other structure. The sweep movement can be described as precession of the tool around the center of spot weld site and retraction entails withdrawal of the tool from contact with the work piece.

This overview is intended to provide a general understanding of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
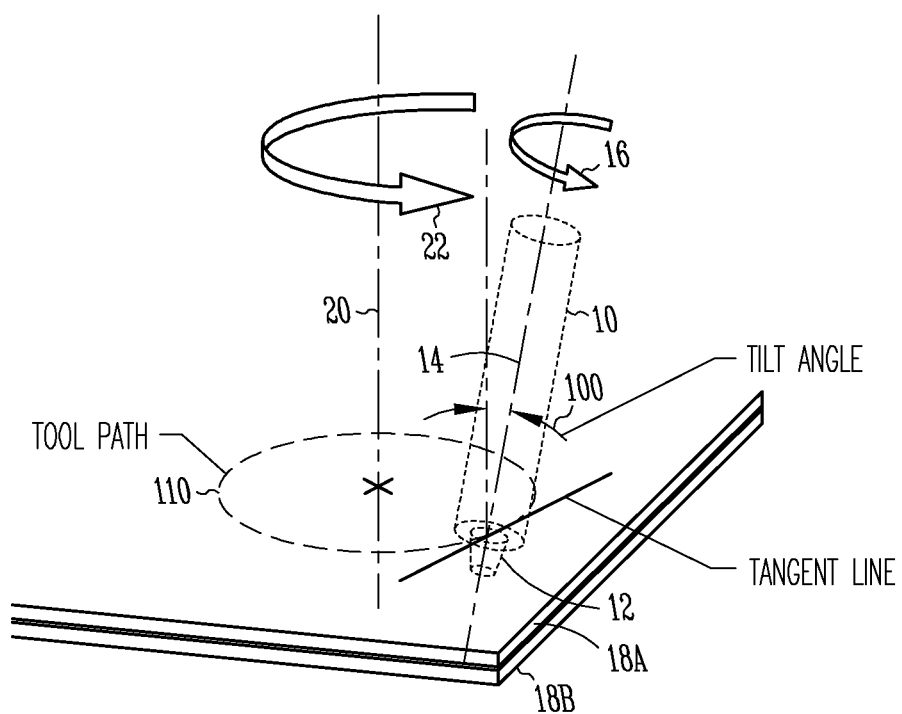
FIG. 1 illustrates tool alignment according to one example.

FIG. 1 illustrates a side view of tool alignment for friction stir spot welding according to one example. In the example shown, tool 10 includes a round shaft having shaped end 12 for forming a friction stir weld in work piece 18. In addition to a shaft having a round section, other sections can also be used, including, for example, a flatted section (such as a rectangle or an octagon) or a curved section (such as an oval). Work piece 18, including part 18A and part 18B, is illustrated here as forming a lap joint. The figure illustrates a joint formed using two work pieces however, more than two work pieces can be joined by a single joint. In addition, one or both work pieces can include an interfacial sealant used to prevent corrosion at the faying surfaces. The sealant can be cured by application of heat, light, or other means. A friction stir spot weld can be formed using a lap joint and a faying surface sealant to produce a discrete integral fastener.

The spot weld is formed in work piece 18 at a location centered on the intersection with axis 20. Tool 10 is rotated on axis 14 as shown by arrow 16. Axis 14 intersects the weld path 110. In the example shown, angle 100 (referred to as a tilt angle) is measured with respect to axis 14 and an axis normal to a line tangent to the weld path 110 located at the point of intersection. Axis 14 is nearly parallel to axis 20. In addition, tool 10 precesses about axis 20 in the orientation as shown by arrow 22. In other words, rotating tool 10 precesses in an orbit at an angle between axis 14 and weld path 110. In one example, the tilt angle is approximately 0.5 degrees. Axis 14 and axes 20 may be coincident or intersect on the plunge portion and the retract portion of the weld but during the sweep portion they do not intersect at any location above or below the weld site during the sweep.

Figure 2:
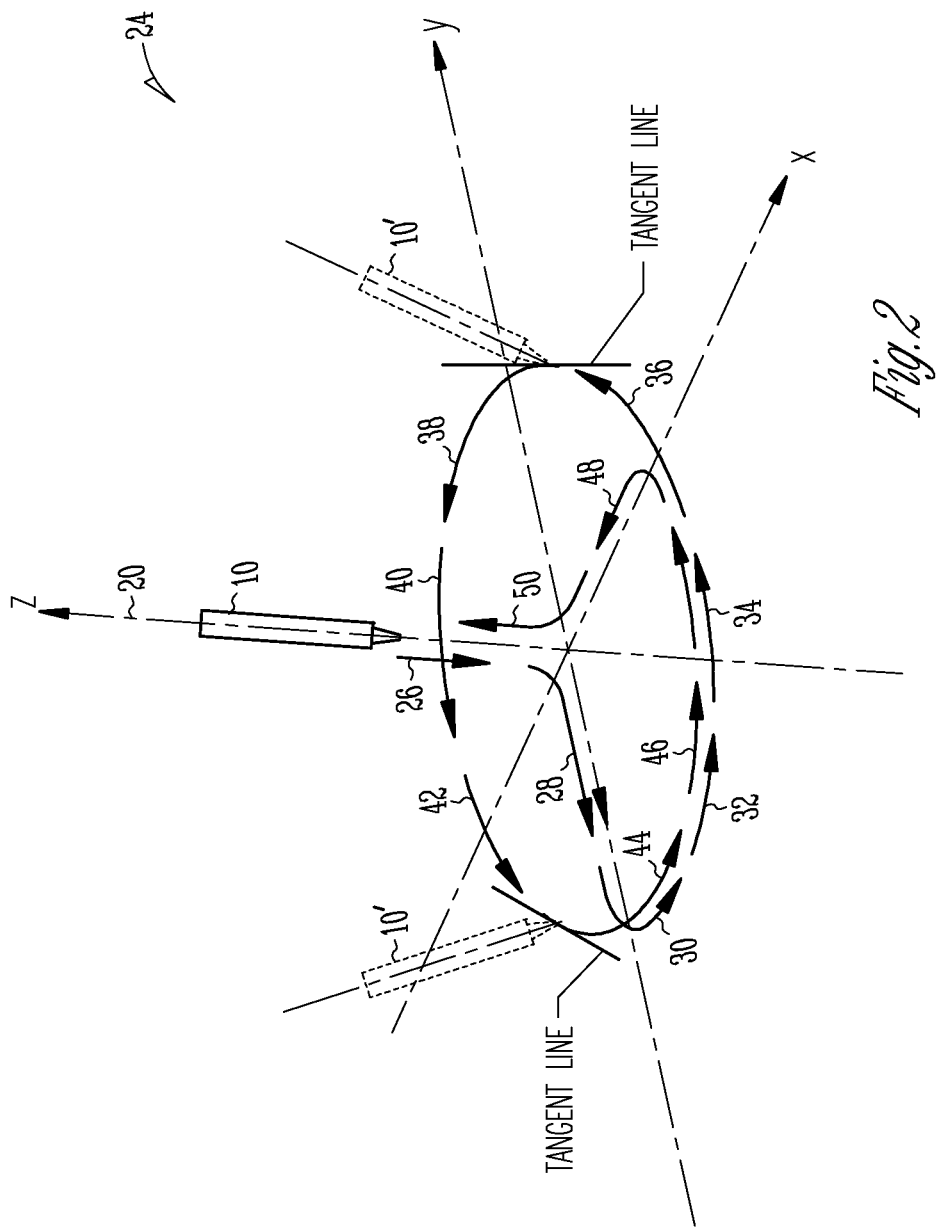
FIG. 2 illustrates a tool path according to one example.

FIG. 2 illustrates composite view 24 of a tool path according to one example. The figure illustrates one possible sequence for forming a spot weld (a discrete integral fastener) in a work piece. According to one example, the work piece (not shown) lies in the plane formed by the x-axis and the y-axis. The z-axis (axis 20) passes through the spot weld location normal (perpendicular) to the surface of work piece 18.

At the outset, tool 10 plunges vertically into the center of the x-y plane, along axis 20, as shown by arrow 26. Tool 10 then tilts and moves along a path shown at arrow 28. Arrow 28 shows the path of tool 10 as it moves out to the perimeter of the sweep. Arrow 30 shows the path of tool 10 as it begins to sweep and arrows 32, 34, 36, 38, 40, 42, 44, and 46 show the tool executing a path sweeping through 450 degrees as illustrated in this example. Arrow 48 shows tool 10 moving in to the center of the weld site and arrow 50 shows tool 10 retracting from the weld site. The alignment of tool 10 is illustrated by tool 10' shown in phantom lines at the portions of the path corresponding to arrow 44 and arrow 38.

The path followed by tool 10 in FIG. 2 is an example suitable for forming a swept spot weld. The path shown is circular however other movements are also contemplated, including a path having linear segments that sweeps through an octagonal shape. The tool path depicted in example in FIG. 2 can be modified to include an arc between the starting point and the circular path or between the circular path and the ending point. A tool path having arcs at both the start and at the end of the circular path is sometimes referred to as a 'squircle.'

Figure 3A:
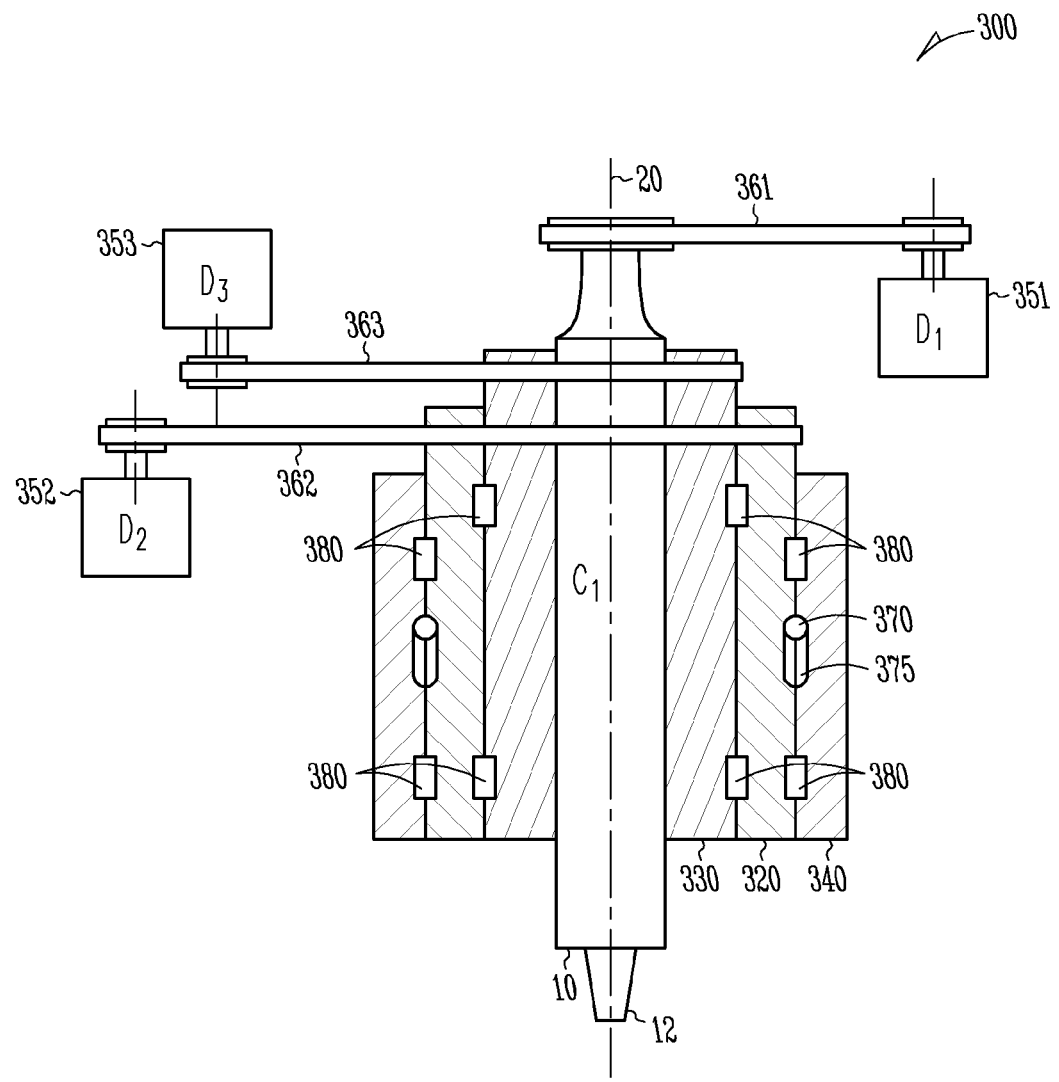
FIG. 3A illustrates an apparatus according to one example.

FIG. 3A illustrates a schematic of apparatus 300 and the kinematic relationship between selected components, according to one example. Apparatus 300 is configured to control movement of tool 10 for forming a friction stir spot weld. In the figure, tool 10 is shown with a shoulder extending beyond the lower surface of the tool holder and having an initial position aligned concentrically with axis 20. Tool 10 includes shaped end 12 configured to contact the work piece (not shown) for forming a weld.

Apparatus 300 includes sleeve 330 having an inside surface configured for holding tool 10. In one example, sleeve 330 includes a collet, taper, or other tool holding mechanism. The outside surface of sleeve 330 is configured to fit within an inside surface of sleeve 320. Sleeve 330 may be mounted and retained in sleeve 320 by bearing 380. Bearing 380 can include a ball bearing, a thrust bearing, a needle bearing, or a bushing. The outside surface of sleeve 320 is configured to fit within an inside surface of sleeve 340. In addition, sleeve 320 can be mounted and retained in sleeve 340 by bearing 380. Sleeve 340 is mounted to the machine or robot for support. A sleeve can also be referred to as a carrier.

Apparatus 300 includes driver 351 coupled to tool 10 by belt 361, driver 353 coupled to sleeve 330 by belt 363, and driver 352 coupled to sleeve 320 by belt 362. In one example, each of drivers 351, 352, and 353, include independently operable motors (e.g. electric or hydraulic). Other forms of power transmission are also contemplated, including belts, gears, shafts, and chains. Tool 10 is driven by a power unit that can include any one or more of drivers 351, 352, and 353 as well as any associated transmission component such as a belt, a gear, a shaft, and a chain. The power unit is configured to rotate tool 10 on it's axis, to move tool 10 on a path relative to the work piece, or to both rotate and move tool 10. In one example, the power unit includes an output drive to which the tool holder is coupled.

According to one example, shaped end 12 can be plunged and retracted using a ball bearing track mechanism. Ball bearing 370 travels in track 375 at the interface between sleeve 340 and sleeve 320 in order to allow plunging and retracting of tool 10. A suitable motor drive can be configured to move tool 10 axially to allow plunging and retracting along axis 20. In addition to a ball bearing type of mechanism, other mechanisms for plunging and retracting are also contemplated, including, for example, machine threads.

Sleeves 330, 320, and 340 are configured to provide a particular specified tool motion when rotated using the corresponding drivers. In various examples, the bore of at least one of sleeve 330, 320, and 340 is eccentric with respect to the outer diameter. In various examples, the axis of a bore in at least one of sleeve 330, 320, and 340 is tilted with respect to an axis of the outer diameter. In various examples, drives 351, 352, and 353 are independently controlled in order to control the corresponding sleeve and tool 10 in order to form an in situ integral fastener. For example, drives 351, 352, and 353 can be simultaneously or serially operated.

One example of apparatus 300 includes a plurality of cylindrical housings that enable positioning and translating of the tool. In one example, apparatus 300 includes one or more eccentric cylinders to orient the tool and to move the tool in a predetermined path. The path can be described as circular and can include motion out from and back into the center of the weld site.

FIG. 3A illustrates an example in which an axis of tool 10 is offset from an axis of a driving motor, such as driver 351, 352, or driver 353. This configuration can provide clearance to enable formation of SFSSW in areas of restricted access (such as low headroom). For example, the lip skin of an aircraft nacelle can be joined to an underlying structure using an offset drive configuration such as that illustrated in FIG. 3A. The figure illustrates a belt drive arrangement coupled to tool 10, however, other configurations can also be used. For example, tool 10 can be driven by a direction-changing gear box coupled to a rigid drive shaft or to a flexible drive shaft, or other power transmission system. In one example, a transmission of the power unit can drive tool 10 at a user-selectable angle relative to the rotation axis of the driving motor.

Figure 3B:
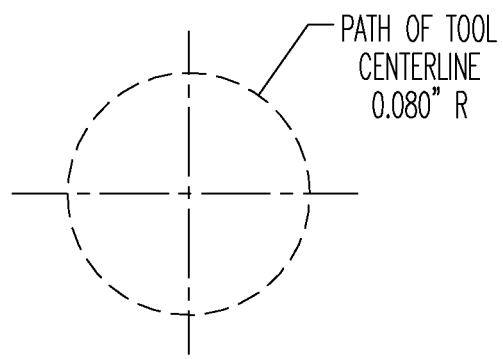
FIG. 3B illustrates an example of a tool path during swept motion.

FIG. 3B illustrates a plan view of an example of a tool path during swept motion. The example shown depicts a path in which the tool centerline describes a circle having a radius of 0.080 inches. As such, FIG. 3B can be viewed as a depiction of the outer tool path during swept motion.

Figure 3C:
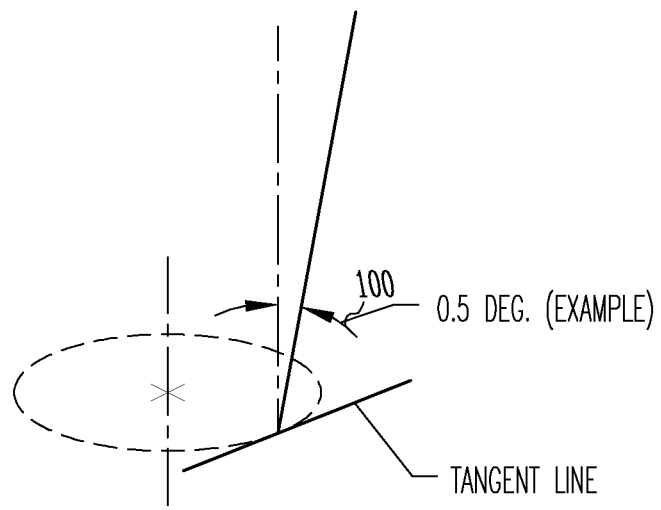
FIG. 3C illustrates an example of tool precession during swept motion.

FIG. 3C illustrates an isometric view of an example of tool precession during swept motion. The example shown includes a tilt angle of 0.5 degrees with respect to a line normal to a tangent to the tool path.

The present subject matter can be configured to move the tool in a path as illustrated in FIGS. 3B and 3C.

Figure 4:
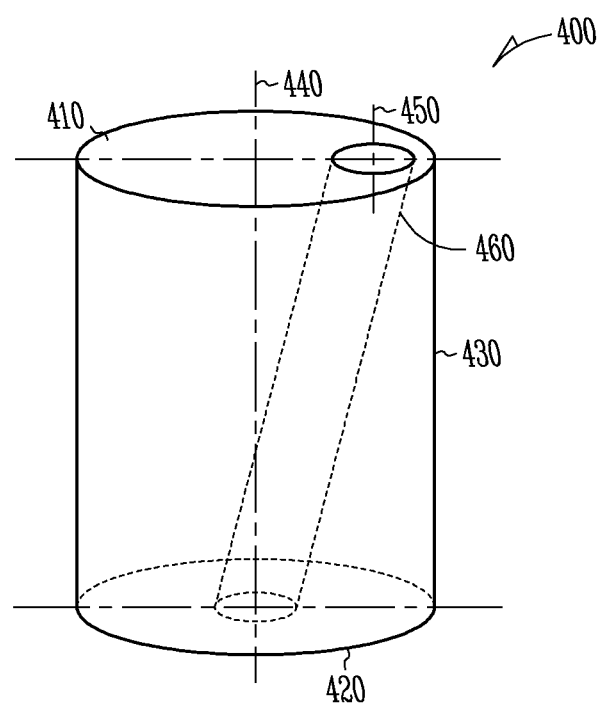
FIG. 4 illustrates a portion of a tool positioning apparatus according to one example.

FIG. 4 illustrates sleeve 400 which can represent any of sleeve 330, 320, and 340. In the figure, sleeve 400 includes a right cylinder having upper surface 410, lower surface 420, and outer wall 430. Outer wall 430 is concentric with axis 440. Bore 460 is aligned with axis 450 on upper surface 410 (offset) and aligned with the center of lower surface 420. Bore 460 is tilted with respect to outer wall 430 and when sleeve 400 is rotated on axis 440, a tool 10 (or sleeve) within bore 460 will move in a tilted path.

In the example shown, bore 460 is tilted with respect to axis 440. In one example, bore 460 is parallel with axis 440.

In the example shown, sleeve 400 includes a cylinder. In one example, sleeve 400 includes a truncated cone (conical or tapered) shaped element.

Referring to FIG. 3, a particular pathway for tool 10 can be achieved by suitable selection of sleeves 330, 320, and 340 as depicted by representative sleeve 400. In addition, a particular sequence of rotating, plunging, precessing, and retracting can be achieved by suitably controlling operation of drivers 351, 352, and 353.

Sleeves 330, 320, and 340 are illustrated as solid elements and in one example, includes a rotary bearing (such as a ball bearing or a needle bearing) or a bushing.

Using the apparatus of FIG. 3, a swept friction stir spot weld can be formed using the path shown in FIG. 2. The method entails energizing driver 351 to rotate tool 10 at approximately 1500 rpm to 2500 rpm. In one example, tool 10 rotates at a speed in excess of 2500 rpm (such as 3000 rpm). Tool 10 is used to form a friction stir weld and in one example, a holder (e.g. collet) allows interchanging of different tools. In various examples, a first rotational speed is used for plunging and a second (different) speed is used for sweeping. The holder can include a collet, a movable jaw chuck (such as a three-jaw, a 4-jaw chuck, a scroll chuck, or an independent jaw chuck), a tool shank holder, a coupling device, or other type of device to hold the shank of the tool.

Next, drive 352 is energized to rotate sleeve 320 to advance or plunge tool 10 into the work piece.

In the example shown, ball bearing guides (370, 375) enable the various sleeves to selectively extend and retract. The ball bearing guides are similar to a ball screw mechanism. The ball bearing guide includes an angled (slanted) track about the circumference and a ball that engages the track. In one example, a ball bearing guide allows sleeve 320 to thrust downward and with a cylindrical movement.

Other examples are also contemplated, including those with an additional mechanism to allow a smooth transition between movement of the various sleeves.

Next, drive 353 is energized to rotate sleeve 330 such that tool 10 is aligned with the weld track. In one example, the movement is at an angle of 50 degrees.

Next, drive 352 is energized to rotate sleeve 320 through a path of 450 degrees about the weld site. Other values are also contemplated, such as 360 to 450 degrees and in one example, the path is selectable.

Next, drive 353 is energized in a reverse direction to rotate sleeve 320 such that tool 10 is aligned with the center of apparatus 300. In one example, the movement is through a range of 50 degrees.

Next, drive 352 is energized in a reverse direction to rotate sleeve 320 such that tool 10 retracts away from the work piece. In various examples, an additional mechanism or track is used to make a transition after the 450 degree swept movement.

Next, when using a 450 degree sweep, drive 352 is lastly energized to rotate sleeve 320 to the initial position. In an example having 360 degree sweep, sleeve 320 is already at the initial position at the conclusion of the sweep and additional movement is omitted.

Figure 5:
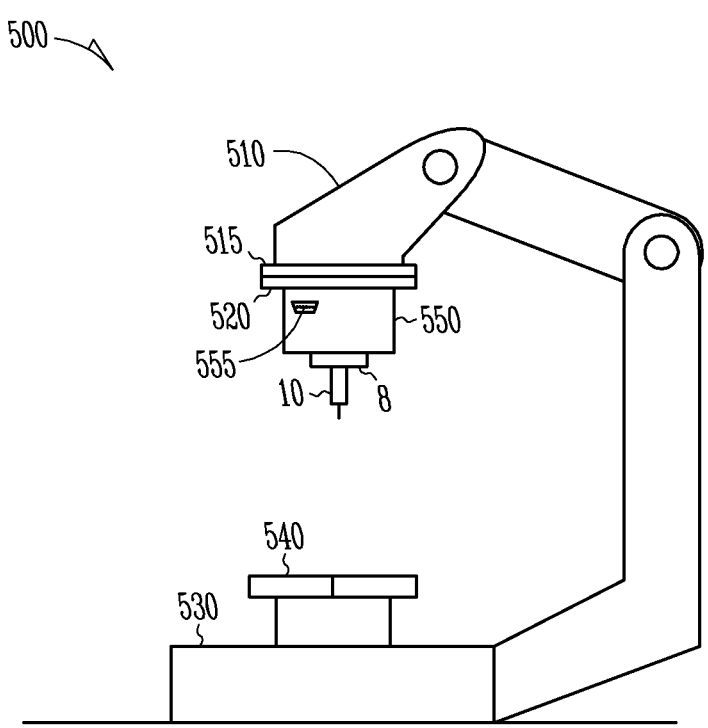
FIG. 5 illustrates a robotic system according to one example.
Figure 6:
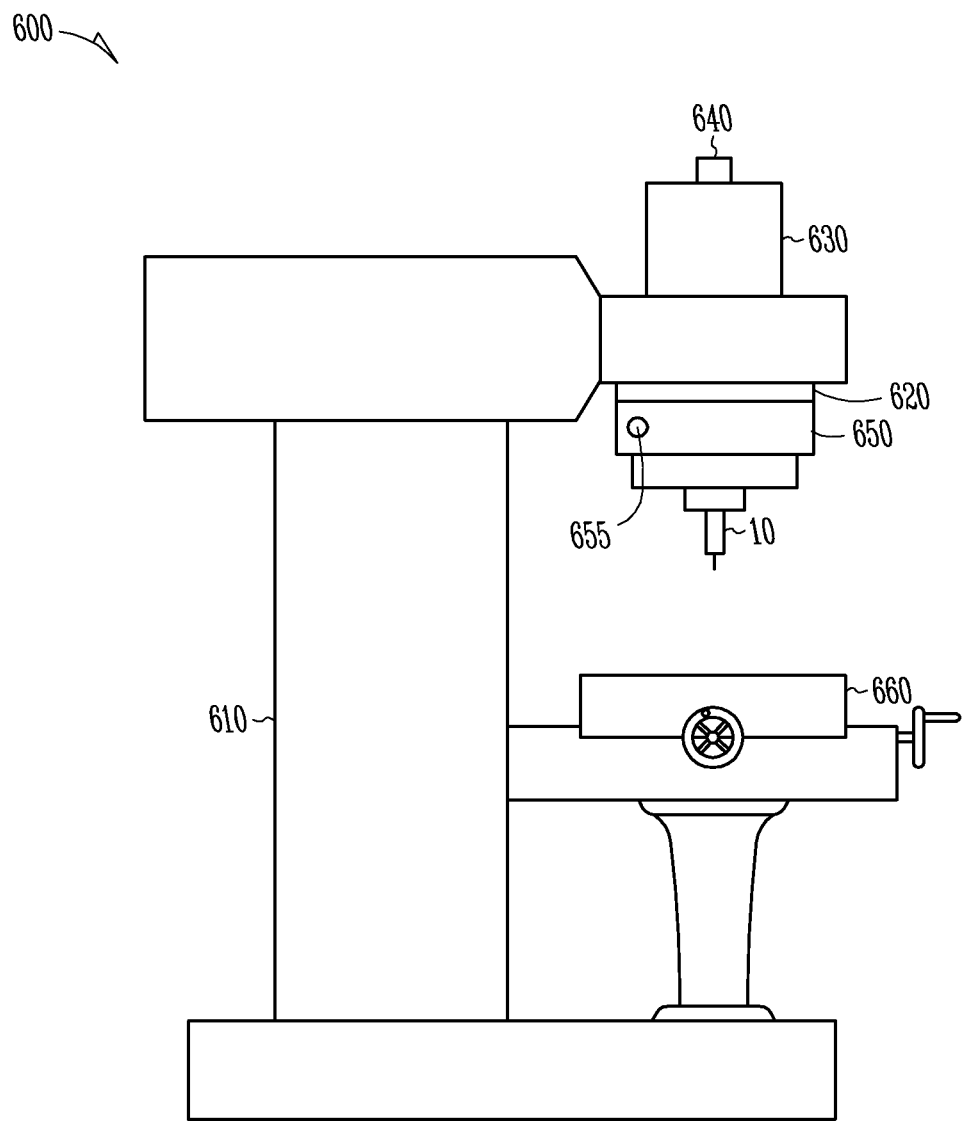
FIG. 6 illustrates a milling machine system according to one example.

Apparatus 300 can be affixed to a suitable machine for forming swept friction stir spot welds. FIGS. 5 and 6 illustrate examples.

FIG. 5 illustrates system 500. System 500 includes robot 510 having a number of articulating arms terminating at end plate 515. Plate 515 includes a mounting surface configured to receive apparatus 550. Robot 510 can include an electric or hydraulic motor configured for controlled movement about a number of axes with respect to base 530. Base 530 carries work surface 540. Work surface 540, in various examples, includes a table, a vise, a magnetic chuck, or other work holding apparatus.

Adapter 520 is affixed to end plate 515 and carries apparatus 550. Apparatus 550 includes a device corresponding to apparatus 300. Apparatus 550 includes connector 555. Connector 555 can include an electrical connector, a hydraulic connector, or other type of connector for providing or receiving a signal corresponding to a requested or measured action of apparatus 550. For example, connector 555 can include an electrical connector to provide power and control signals for operating drivers such as driver 351, 352, and 353. In addition, connector 555 can provide an output signal to indicate a parameter measured by a sensor (e.g., temperature, position).

In various examples, apparatus 550 includes an internal motor (or other rotary power supply) and a transmission to move tool 10 in a predetermined motion independent of movement of robot 510.

In the example shown, tool 10 is carried by tool holder 8 of apparatus 550.

FIG. 5 can also be described as a 'c-frame' robotic system. For example, apparatus 550 can be coupled to a rigid system in which robot 510 has linear elements in a fixed angular relation. As such, system 500 can be used to illustrate a 'c-frame' robotic system.

FIG. 6 illustrates system 600. In the example shown, system 600 includes machine 610. Machine 610 is shown as a milling machine (such as a computer numerical control or CNC machine) and it can also include a machine center, a drill press, a lathe (with motor actuated carriage, cross-slide, or compound rest), or other tool having a rotary spindle. Spindle 640 of machine 610 provides rotary power to apparatus 650. Apparatus 650 includes a device corresponding to apparatus 300 and is coupled to machine 610 by adapter 620. Apparatus 650 includes a transmission to move tool 10 in a path to form a swept friction stir spot weld based on rotary power provided by spindle 640 and a control signal provided to connector 655. Connector 655 can include a hydraulic connector or an electrical connector.

Machine 610 includes work surface 660 and in the example shown, includes a table configured to move along three axes of control. In one example, machine 610 includes more than three axes of control.

In various examples, apparatus 650 includes a transmission to move tool 10 in a predetermined motion independent of movement of table 660.

Additional Examples

In one example, a tilt angle of tool 10 is adjustable or user selectable. A tilt angle can be selected using a variety of mechanisms, including, for example, an eccentric taper mechanism or a replaceable insert having a selected taper angle.

In various examples, tool 10 can be manipulated to clock when tilt is added. For example, tool 10 can be tilted at various angles. Typical values are initially vertical, 0.5 degrees off vertical, 1.0 degree off vertical, and 2.0 degrees off vertical.

In one example, tool 10 has a wiper shoulder and the tilt angle is selected based on the shoulder configuration.

In various examples, the transition between plunge phase and sweep phase and between sweep phase and retract phase is controlled by the configuration of the ball screw mechanism. For example, with a sweep of 450 degrees, the transitions may differ from those for a sweep of 360 degrees.

The present subject matter includes an apparatus for forming a swept friction stir spot welding (SFSSW) joint. A swept friction stir spot weld can be viewed as an in situ integral fastener suitable for use in automotive and aircraft construction applications. A swept friction stir spot weld joint can provide beneficial residual stresses around the spot weld site. Typical work piece dimensions can include common sheet metal thicknesses such as inch sizes of 0.025, 0.032, 0.040, 0.050, 0.063, 0.071, 0.080, 0.090, and 0.100, however larger or smaller dimensions are also contemplated.

The present subject matter includes an end effector suitable for use with a dedicated friction stir welding machine as well as a milling machine or a robot.

One example can be used with a variety of different style friction stir welding tools.

The present subject matter can include any combination of a mechanical structure, a electrical structure, and a hydraulic structure.

Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus for friction stir welding, the apparatus comprising:
    an adapter configured to couple to a machine having at least one axis of control;
    a connector coupled to the adapter and configured to receive a control signal;
    a power unit coupled to the connector and having an output drive, the output drive having a path determined by the control signal;
    a tool holder coupled to the output drive and configured to receive a welding tool, the tool holder configured to carry the welding tool in the path; and
    a plurality of sleeves including a first sleeve and a second sleeve at least one of which is coupled to the tool holder, wherein the path is further determined by movement of the first sleeve relative to movement of the second sleeve.

2. The apparatus of claim 1 wherein the adapter is configured to couple to a robotic arm.

3. The apparatus of claim 1 wherein the connector includes an electrical connector.

4. The apparatus of claim 1 wherein the connector includes a hydraulic connector.

5. The apparatus of claim 1 wherein the power unit includes a motor.

6. The apparatus of claim 1 wherein the power unit includes a transmission.

7. The apparatus of claim 1 wherein the power unit is configured to move the output drive in an orbital path.

8. The apparatus of claim 1 wherein the power unit is configured to rotate the output drive.

9. The apparatus of claim 1 wherein the power unit includes at least one eccentric bearing.

10. The apparatus of claim 1 wherein the tool holder includes at least one of a collet, a tool shank holder, or a coupling device.

11. The apparatus of claim 1 wherein the adapter is configured to affix to at least one of a milling machine, a drill press, and a lathe.

* * * * *